(12) United States Patent
Yang (10) Patent No.: US 12,533,696 B2
(45) Date of Patent: Jan. 27, 2026

(54) ATOMIZER

(71) Applicant: ZHEJIANG PRULDE ELECTRIC APPLIANCE CO., LTD., Jinhua (CN)

(72) Inventor: Weiming Yang, Jinhua (CN)

(73) Assignee: ZHEJIANG PRULDE ELECTRIC APPLIANCE CO., LTD., Jinhua (CN)

( * ) Notice: Subject to any disclaimer, the term of this patent is extended or adjusted under 35 U.S.C. 154(b) by 492 days.

(21) Appl. No.: 18/682,445

(22) PCT Filed: Nov. 17, 2020

(86) PCT No.: PCT/CN2020/129313
§ 371 (c)(1),
(2) Date: Feb. 9, 2024

(87) PCT Pub. No.: WO2022/041503
PCT Pub. Date: Mar. 3, 2022

(65) Prior Publication Data
US 2024/0216936 A1     Jul. 4, 2024

(30) Foreign Application Priority Data

Aug. 27, 2020    (CN) .......................... 202010879854.7

(51) Int. Cl.
*B05B 11/06*     (2006.01)
*B05B 3/08*     (2006.01)

(52) U.S. Cl.
CPC .......... *B05B 11/061* (2013.01); *B05B 3/0204* (2025.08); *B05B 3/082* (2013.01)

(58) Field of Classification Search
CPC ...... B05B 3/0204; B05B 3/082; B05B 11/061
USPC ...... 239/214, 214.21, 222.11, 223, 224, 340, 239/369; 261/28, 78.1, 78.2
See application file for complete search history.

(56) References Cited

U.S. PATENT DOCUMENTS

| 2,738,226 | A | * | 3/1956 | Bals | .................... A01M 7/0014 |
| | | | | | 239/223 |
| 5,667,732 | A | * | 9/1997 | Lederer | ............. B01F 23/21311 |
| | | | | | 261/78.2 |
| 5,715,999 | A | * | 2/1998 | Hsu | ........................ B05B 7/0075 |
| | | | | | 239/222.11 |

(Continued)

FOREIGN PATENT DOCUMENTS

| CN | 102101084 A | 6/2011 |
| CN | 202174020 U | 3/2012 |

(Continued)

*Primary Examiner* — Steven J Ganey
(74) *Attorney, Agent, or Firm* — Bayramoglu Law Offices LLC (57) ABSTRACT

An atomizer is provided. When the atomizer provided by the invention is used, a fan blows air to a water outlet tube, part of the airflow in the water outlet tube passes through a pressurizing tube to enter a water tank to gradually increase the air pressure in the water tank, and liquid in the water tank is pressed into a water inlet tube under high pressure, flows into a guide tube along the water inlet tube and is sprayed out of the guide tube in a direction away from the fan; after flowing out of the guide tube, the liquid is blown out by the airflow blown from the fan into the water outlet tube on the periphery of the guide tube; and the fan is used for blowing air to the water outlet tube and increasing the pressure in the water tank.

10 Claims, 12 Drawing Sheets

(56) References Cited

U.S. PATENT DOCUMENTS

| | | | | |
|---|---|---|---|---|
| 6,216,961 | B1* | 4/2001 | Utter | B05B 7/0075 |
| | | | | 239/222.11 |
| 2006/0060177 | A1 | 3/2006 | Shih | |
| 2010/0133358 | A1 | 6/2010 | Goehring | |
| 2013/0175358 | A1* | 7/2013 | Lee | B05B 3/0204 |
| | | | | 239/214 |

FOREIGN PATENT DOCUMENTS

| | | |
|---|---|---|
| CN | 203400811 U | 1/2014 |
| CN | 105665180 A | 6/2016 |
| CN | 207042717 U | 2/2018 |
| CN | 208275632 U | 12/2018 |
| CN | 110167681 A | 8/2019 |
| DE | 202008017954 U1 | 12/2010 |

\* cited by examiner

ATOMIZER

CROSS REFERENCE TO THE RELATED APPLICATIONS

This application is the national phase entry of International Application No. PCT/CN2020/129313, filed on Nov. 17, 2020, which is based upon and claims priority to Chinese Patent Application No. 202010879854.7, filed on Aug. 27, 2020, the entire contents of which are incorporated herein by reference.

TECHNICAL FIELD

The invention belongs to the technical field of electric tools, and particularly relates to an atomizer.

BACKGROUND

Atomizers are often used for spraying medical solutions or solvents in the form of mist and vapor. Generally, a fan mounted in the atomizer rotates to blow air to an air outlet tube to form an airflow from inside to outside in the air outlet tube; then, an air pump is used for increasing the pressure in a water tank to allow liquid in the water tank to enter the air outlet tube along a connecting line between the air outlet tube and the water tank under pressure; and finally, liquid entering the air outlet tube is blown out of the air outlet tube by the fan to be sprayed in the form of mist and vapor. However, the atomizer of such a structure adopts a fan for blowing air to the air outlet tube and an air pump for increasing the pressure in the water tank, thus being complex in structure; and the atomizer has a large size, thus being inconvenient to use.

SUMMARY

To overcome the defects of a complex structure of existing atomizers caused by the use of a fan for blowing air to an air outlet tube and an air pump for increasing the pressure in a water tank and inconvenience in use of the existing atomizers caused by a large size, the invention provides an atomizer which has a simple structure.

The objective of the invention is fulfilled through the following technical solution: an atomizer comprises a housing, a water outlet tube, a fan for blowing air to the water outlet tube, a motor for driving the fan to rotate, a water tank, and a power supply for supplying power to the motor, wherein a guide tube for discharging water from the water outlet tube in a direction away from the fan is fixedly arranged in the water outlet tube, a pressurizing tube connected to the water tank is arranged in water outlet tube, a water inlet tube connected to the water tank is arranged in the guide tube, and an end, away from the guide tube, of the water inlet tube is located at a bottom of an interior of the water tank.

Preferably, a control switch for controlling the fan to be turned on or off and the water outlet tube to be opened or closed is arranged in the housing, the control switch comprises a push button for controlling the fan to be turned on or off and a press button for driving a regulating mechanism to move, a sliding groove used for clamping the push button and allowing the push button to reciprocate in a length direction of the push button is formed in the housing, a rotating rod is fixedly arranged in the housing, the press button is rotatably arranged on the rotating rod, the press button has an end located below the push button as well as an end leaning against the regulating mechanism, a fixed rod is fixedly arranged at a lower end of the push button, a clamping groove for clamping the fixed rod is formed in an upper surface of a side, away from the regulating mechanism, of the press button, and the push button is able to move towards the press button in a length direction of the sliding groove and press the press button to enable the press button to rotate around the rotating rod to allow the clamping groove in the press button to rotate upwards around the rotating rod to clamp the fixed rod.

Preferably, a fixed pillar is fixedly arranged on an end face, facing the press button, of the fixed rod, the fixed pillar is sleeved with a spring for driving the push button to move away from the press button, a clamping seat used for clamping the spring and having an opening facing the fixed rod is fixedly arranged in the housing, and an end, away from the fixed pillar, of the spring is clamped in the clamping seat.

Preferably, the rotating rod is sleeved with a torsion spring for driving an end, away from the regulating mechanism, of the press button to rotate downwards around the rotating rod, a clamping pillar is fixedly arranged on the housing and located above the press button, one end of the torsion spring is clamped on the clamping pillar, and the other end of the torsion spring is fixedly arranged on the press button.

Preferably, a push block is fixedly arranged at an upper end of the push button, an upper end of the push block is located on an outer side of the housing, a moving groove for clamping the push block is formed in the housing, the moving groove is longer than the push block, on and off marks are arranged on the push button, and the two marks are respectively located on two sides of the push block on the push button, located on a same line as the push block and parallel to the length direction of the push button.

Preferably, a regulating mechanism for regulating an outlet flow rate of the water outlet tube is arranged between the control switch and the water outlet tube, the regulating mechanism comprises a spline shaft rotatably arranged in the housing and a rotating ferrule disposed around the spline shaft and capable of moving in a length direction of the spline shaft, a guide groove matched with the spline shaft is formed in an inner wall of the rotating ferrule, a limiting plate used for restraining the rotating ferrule from moving in the length direction of the spline shaft is fixedly arranged on the housing, a rotating groove extending into the spline shaft is formed in a lower surface of the spline shaft, an ejector rod is movably arranged in the rotating groove by threaded connection, a guide plate is fixedly arranged on each of two sides of the ejector rod, clamping grooves are fixedly arranged in the housing, the guide plates are able to move in the clamping grooves in a length direction of the ejector rod as the ejector rod moves, and an adjusting knob for controlling the rotating ferrule to rotate is arranged on the housing.

Preferably, the adjusting knob is rotatably arranged on the housing, a first gear is fixedly arranged at an end, facing the ejector rod, of the rotating ferrule, a second gear always meshed with the first gear is fixedly arranged at an end, facing the rotating ferrule, of the adjusting knob, and the adjusting knob is able to drive the rotating ferrule to rotate around a central axis of the rotating ferule by means of the first gear and the second gear matched with the first gear.

Preferably, the first gear is a bevel gear, the second gear inclines gradually towards a periphery of the adjusting knob in a direction from the adjusting knob to the rotating ferrule, and a length direction of teeth on the second gear is perpendicular to a length direction of teeth on the first gear.

Preferably, a spacing ring is fixedly arranged at the end, facing the ejector rod, of the rotating ferrule, the spacing ring is located in the first gear and disposed around the ejector rod, an inner diameter of the spacing ring is less than an outer diameter of the spline shaft, a positioning ring is fixedly arranged on the ejector rod, and a diameter of the positioning ring is greater than a diameter of the ejector rod and less than the inner diameter of the spacing ring. Preferably, a retaining block is fixedly arranged at an end, away from the ejector rod, of the spline shaft.

Preferably, a cover plate capable of closing a battery compartment is rotatably arranged on the housing 1

Compared with the prior art, when the atomizer provided by the invention is used, the fan blows air to the water outlet tube, part of the airflow in the water outlet tube passes through the pressurizing tube to enter the water tank to gradually increase the air pressure in the water tank, and liquid in the water tank is pressed into the water inlet tube under high pressure, flows into the guide tube along the water inlet tube and is sprayed out of the guide tube in a direction away from the fan; after flowing out of the guide tube, the liquid is blown out by means of the airflow blown from the fan into the water outlet tube on the periphery of the guide tube; and the fan is used for blowing air to the water outlet tube and increasing the pressure in the water tank, thus greatly reducing the size of the atomizer, improving the water spraying efficiency of the atomizer and realizing high applicability of the atomizer.

BRIEF DESCRIPTION OF THE DRAWINGS

FIG. 8 is an overall structural view after the control switch is turned on.

Reference signs: 1, housing; 2, press button; 3, water outlet tube; 4, spline shaft; 5, rotating ferrule; 6, guide groove; 7, limiting plate; 8, rotating groove; 9, ejector rod; 10, guide plate; 11, clamping groove; 12, adjusting knob; 13, first gear; 14, second gear; 15, spacing ring; 16, positioning ring; 17, retaining block; 18, control switch; 19, regulating mechanism; 20, push button; 21, sliding groove; 22, rotating rod; 23, fixed rod; 24, clamping groove; 25, fixed pillar; 26, spring; 27, clamping seat; 28, torsion spring; 29, clamping pillar; 30, push block; 31, moving groove; 32, mark; 33, water tank; 34, fan; 35, battery compartment; 36, cover plate; 37, guide tube; 38, moving rod; 39, plug; 40, shifting block; 41, pressurizing tube; 42, water inlet tube; 43, sealing ring; 44, flange; 45, motor; 46, power supply.

DETAILED DESCRIPTION OF THE EMBODIMENTS

Figure 1:
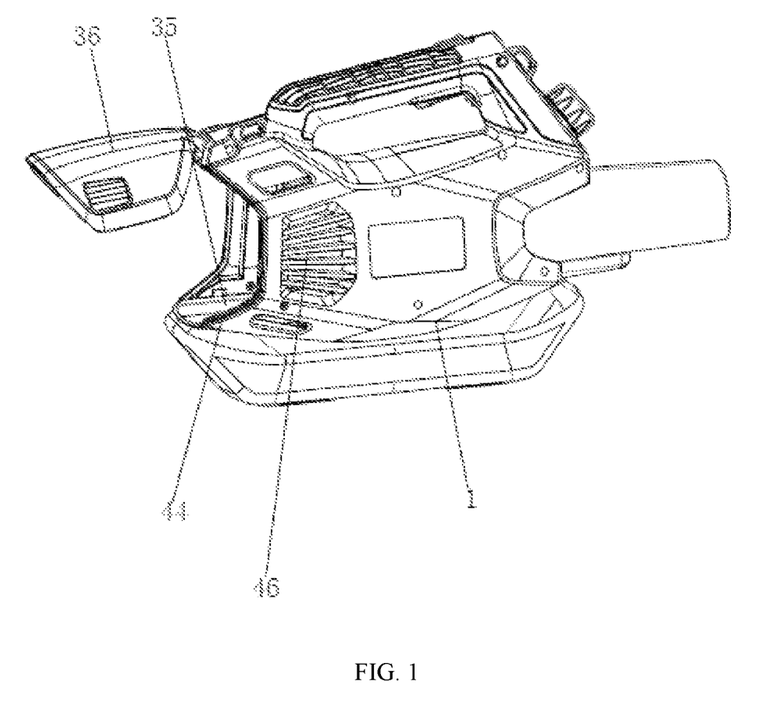
FIG. 1 is an overall structural view of the invention.
Figure 2:
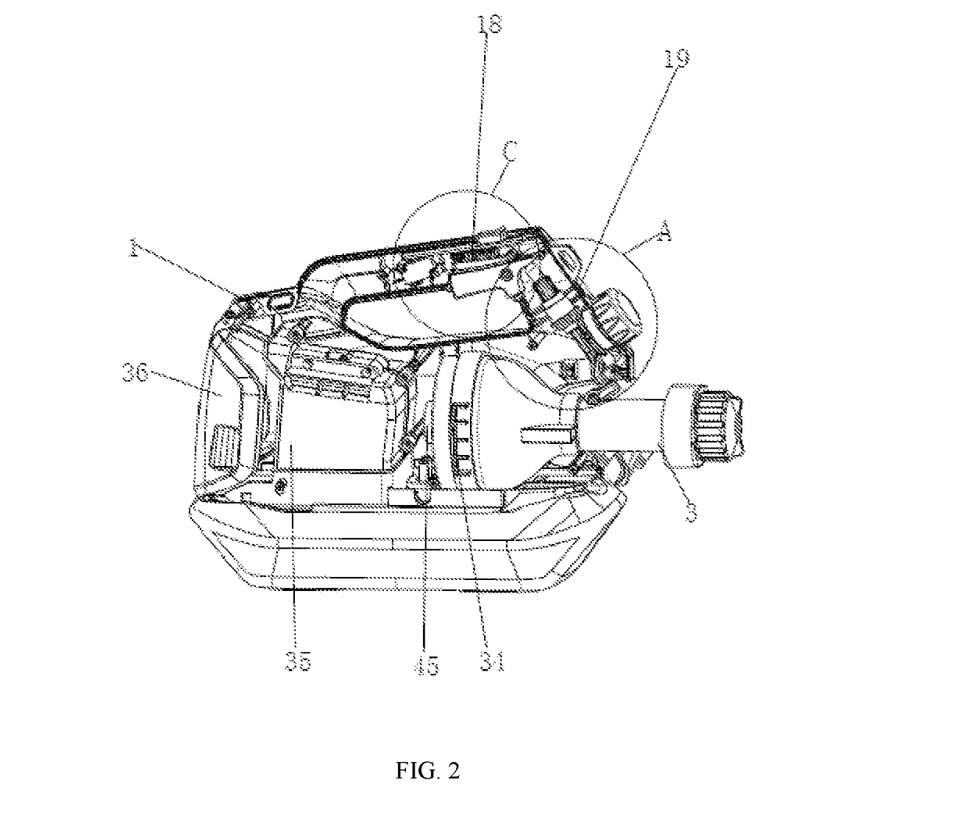
FIG. 2 is an internal structural view of an atomizer.
Figure 3:
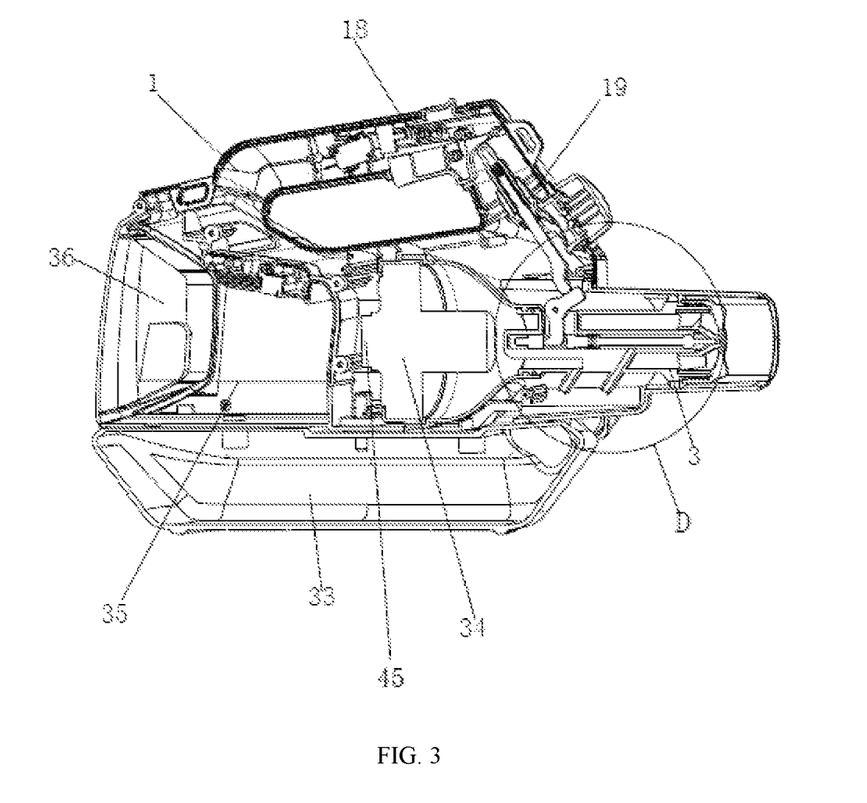
FIG. 3 is an internal structural sectional view of the atomizer.
Figure 4:
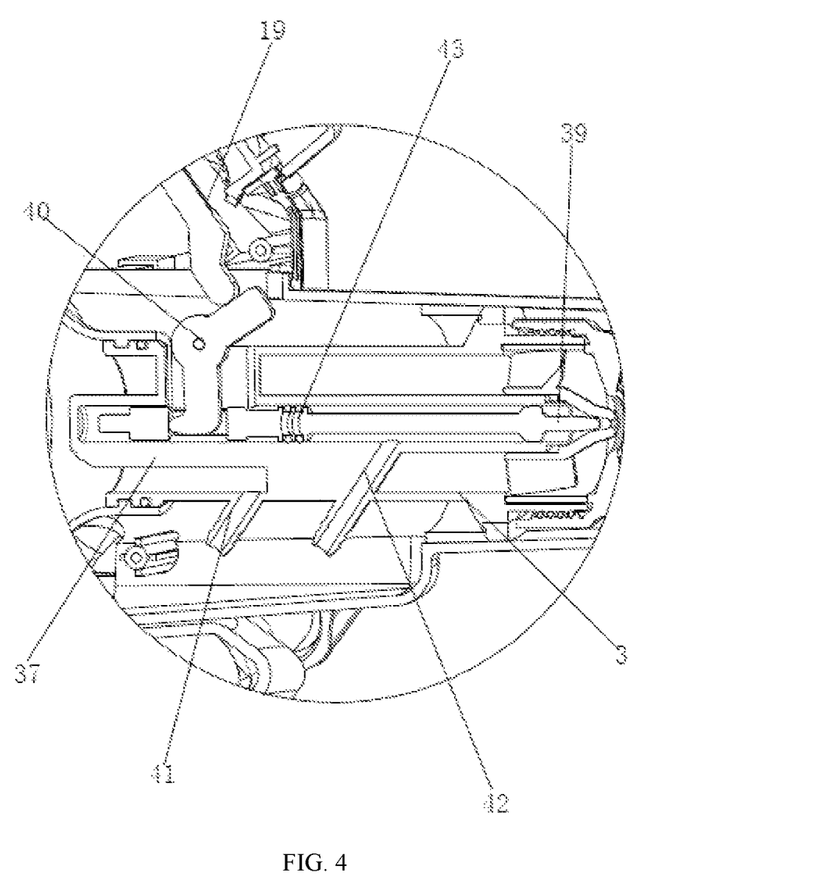
FIG. 4 is an enlarged view of part D in FIG. 3.
Figure 5:
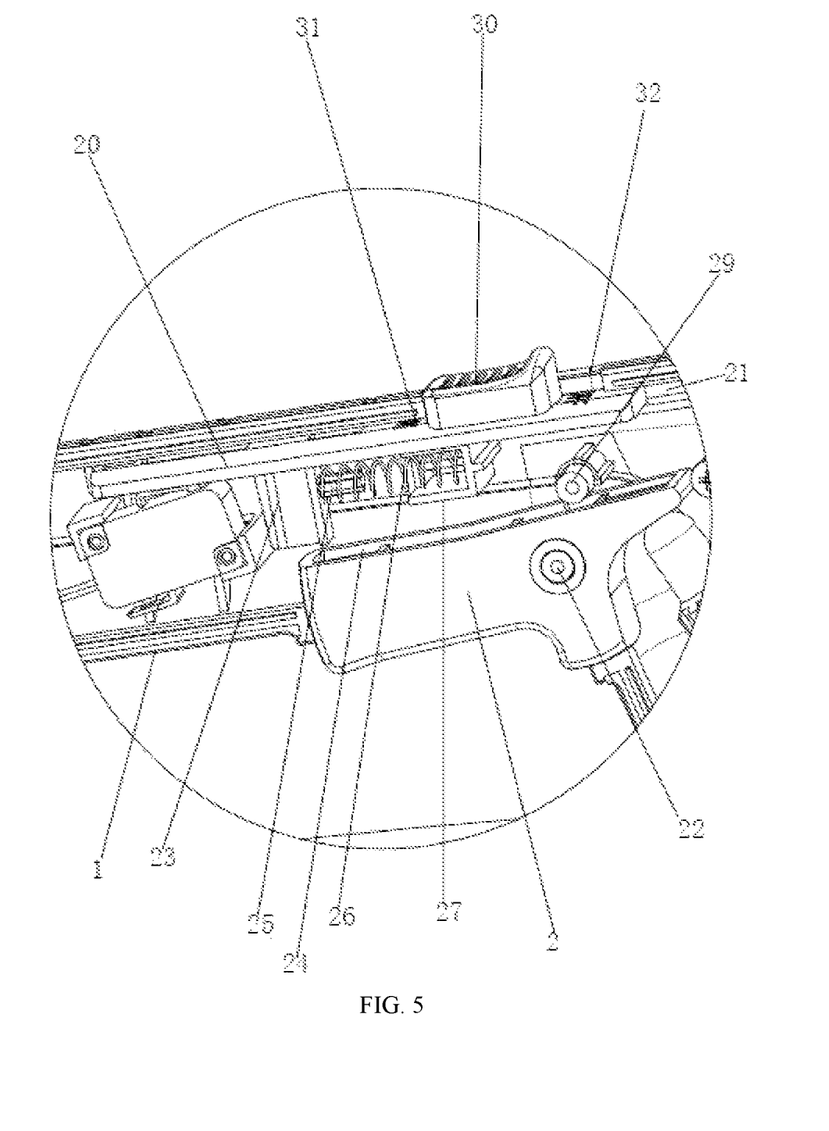
FIG. 5 is an enlarged view of part C in FIG. 2.
Figure 6:
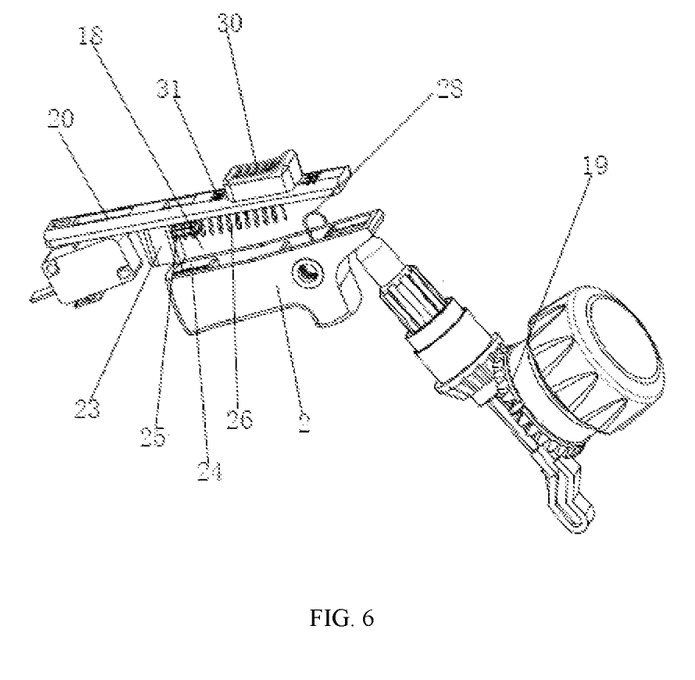
FIG. 6 is an overall structural view of a control switch and a regulating mechanism.
Figure 7:
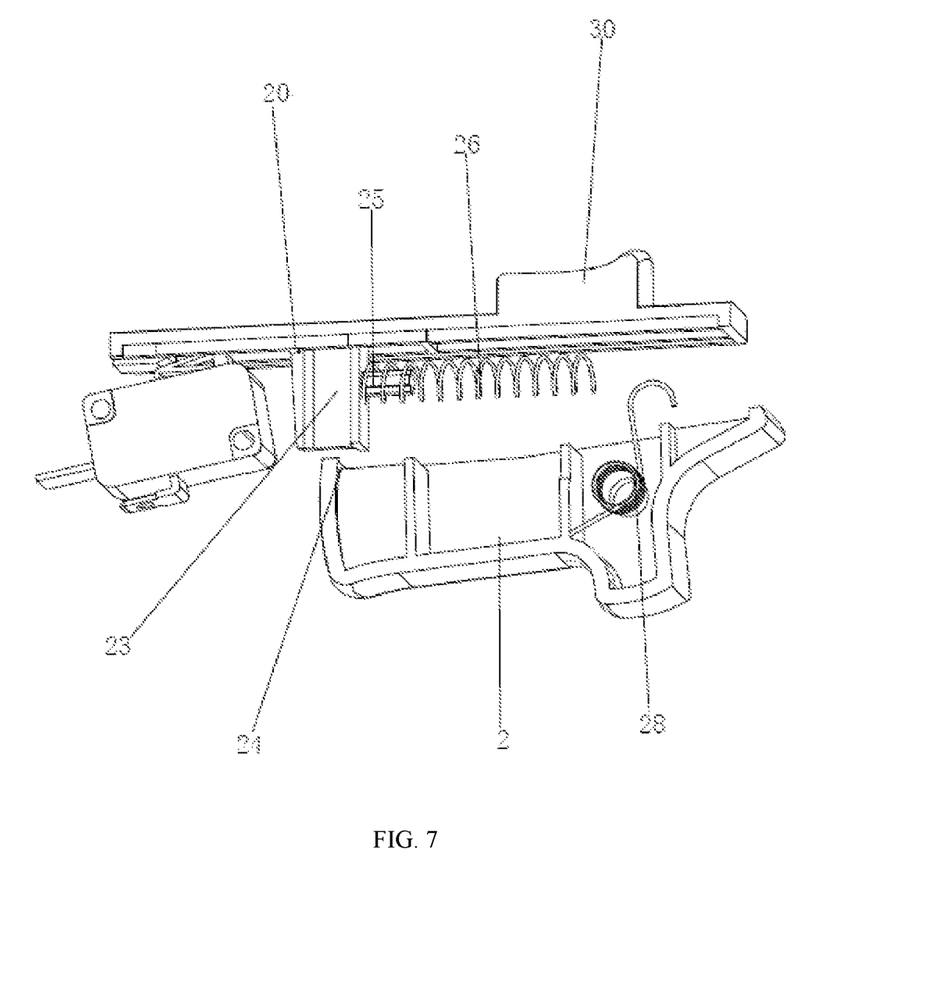
FIG. 7 is a sectional view of the control switch.
Figure 8:
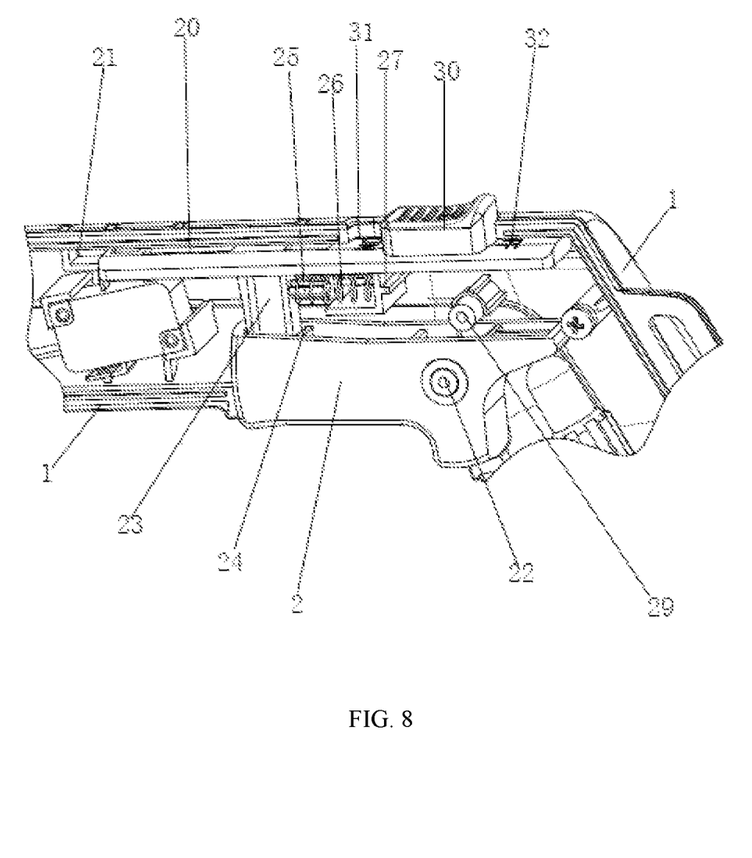

The invention is further described below in conjunction with embodiments illustrated by the accompanying drawings: as shown in FIGS. 1-8, an atomizer comprises a housing 1 and a water tank 33 fixedly arranged at a lower end of the housing, wherein a water outlet tube 3, a fan 34 for blowing air to the water outlet tube 3, a motor 45 for driving the fan 34 to rotate, and a power supply 46 for supplying power to the motor 45 are fixedly arranged in the housing 1, the power supply 46 comprises a battery compartment 35 formed in an end, away from the water outlet tube 3, of the housing 1 and used for mounting a detachable battery pack and supplying power to the motor, a cover plate 36 capable of closing the battery compartment 35 is rotatably arranged on the housing 1, a control switch 18 for controlling the fan 34 to be turned on or off and the water outlet tube 3 to be opened or closed is arranged in the housing 1, a regulating mechanism 19 for regulating the outlet flow rate of the water outlet tube 3 is arranged between the control switch 18 and the water outlet tube 3, the control switch 18 comprises a push button 20 for controlling the fan to be turned on or off and a press button 2 for driving the regulating mechanism 19 to move, a sliding groove 21 used for clamping the push button 20 and allowing the push button 20 to reciprocate in a length direction of the push button 20 is formed in the housing 1, a rotating rod 22 is fixedly arranged in the housing 1, the press button 2 is rotatably arranged on the rotating rod 22, one end of the press button 2 is located below the push button 20, the other end of the press button 2 leans against the regulating mechanism 19, a fixed rod 23 is fixedly arranged at a lower end of the push button 20, a clamping groove 24 for clamping the fixed rod 23 is formed in an upper surface of a side, away from the regulating mechanism 19, of the press button 2, the push button 20 is able to move towards the press button 2 in a length direction of the sliding groove 21 and press the press button 2 to enable the press button 2 to rotate around the rotating rod 22 to allow the clamping groove 24 in the press button 2 to rotate upwards around the rotating rod 22 to clamp the fixed rod 23.

A flange 44 for clamping the cover plate 36 is arranged on the housing 1. The cover plate 36 is clamped on the flange 44 after being closed, thus effectively protecting detachable batteries located in the battery compartment 35.

A fixed pillar 25 is fixedly arranged on an end face, facing the press button 2, of the fixed rod 23, the fixed pillar 25 is sleeved with a spring 26 for driving the push button 20 to move away from the press button 2, a clamping seat 27 used for clamping the spring 26 and having an opening facing the fixed rod 23 is fixedly arranged in the housing 1, and an end, away from the fixed pillar 25, of the spring 26 is clamped in the clamping seat 27. The rotating rod 22 is sleeved with a torsion spring 28 for driving an end, away from the regulating mechanism 19, of the press button 2 to rotate downwards around the rotating rod 22, a clamping pillar 29 is fixedly arranged on the housing 1 and located above the press button 2, one end of the torsion spring 28 is clamped on the clamping pillar 29, and the other end of the torsion spring 28 is fixedly arranged on the press button 2.

A push block 30 is fixedly arranged at an upper end of the push button 20, an upper end of the push block 30 is located on an outer side of the housing 1, a moving groove 31 for clamping the push block 30 is formed in the housing 1, and the moving groove 31 is longer than the push block 30. On and off marks 32 are arranged on the push button 20, and the two marks 32 are respectively located on two sides of the push block 30 on the push button 20, located on a same line as the push block 30 and parallel to the length direction of the push button 20. In this way, the operating state of the atomizer can be visually displayed.

The water outlet tube 3 is disposed around the fan 34, a guide tube 37 is fixedly arranged in the water outlet tube 3, a moving rod 38 which is able to move in a length direction of the guide tube 37 and block an outlet of the guide tube 37 is movably arranged in the guide tube 37, a plug 39 is fixedly arranged at an end, facing an opening of the guide tube 37, of the moving rod 38, a shifting block 40 for driving the moving rod 38 to move in the guide tube 37 in a length direction of the guide tube 37 is rotatably arranged on the water outlet tube 3 and leans against a lower end of the regulating mechanism, a pressurizing tube 41 connected to the water tank is arranged in the water outlet tube 3, a water inlet tube 42 connected to the water tank is arranged in the guide tube 37, an end, away from the water outlet tube 3, of the pressurizing tube 41 is located at an upper end of the interior of the water tank, an end, away from the guide tube 37, of the water inlet tube 42 is located at the bottom of the interior of the water tank, two sealing rings 43 are fixedly arranged around the moving rod 38 and located between the shifting block 40 and the plug 39 to prevent liquid entering the guide tube 37 from flowing into an end, close to the fan 34, of the guide tube 37, and a joint between the water inlet tube 42 and the guide tube 37 is located between the sealing rings 43 and the plug 39. The regulating mechanism 19 is pressed by means of the press button 2 to push the shifting block 40 to drive the moving rod 38 to move towards the fan along the guide tube 37 to enable the plug 39 to disengage from the opening of the guide tube 37, air enters the water tank through the pressurizing tube 41, the pressure above the liquid level in the water tank 33 is increased, and liquid enters the guide tube 37 via the water inlet tube 42 under pressure and is sprayed out via the opening of the guide tube 37. By changing the length of the regulating mechanism 19, the moving distance of the moving rod 38 can be changed to adjust a gap between the plug 39 on the moving rod 39 and an opening of the water outlet tube 3, the outlet flow rate can be regulated by adjusting the gap between the plug 39 and the opening of the water outlet tube 3, the structure is simple, and using is convenient.

In use, the push button 20 is pushed to move towards the press button 2 to start the fan by means of a fan controller, the push button 20 drives the fixed rod 23 on the push button 20 to be located above the clamping groove 24 in the press button 2, the press button 2 is held to drive the end, away from the regulating mechanism 19, of the press button 2 to rotate upwards around the rotating rod 22 until the clamping groove 24 in the press button 2 clamps the lower end of the fixed rod 23, and at this moment, the atomizer starts to spray water; either the push button 20 or the press button 2 is pressed separately, the atomizer will not spray water; the spring 26 applies a force to the fixed rod 23 to drive the fixed rod 23 to move away from the press button 2 until the lower end of the fixed rod 23 is steadily clamped in the clamping groove 24, and the torsion spring 28 applies a force to the end, away from the regulating mechanism 19, of the press button 2 to drive said end to rotate downwards around the rotating rod 22; after users release the press button 2, the end, away from the regulating mechanism 19, of the press button 2 will be driven under the action of the torsion spring 28 to rotate downwards around the rotating rod 22 to allow the fixed rod 23 to disengage from the clamping groove 24, and the fixed rod 23 moves away from the press button 2 along the sliding groove 21 under the action of the spring 26 to control the fan controller to be turned off. In this way, the atomizer can be used easily, and the situation where the atomizer is started due to mistouch of the press button 2 is effectively avoided.

Figure 9:
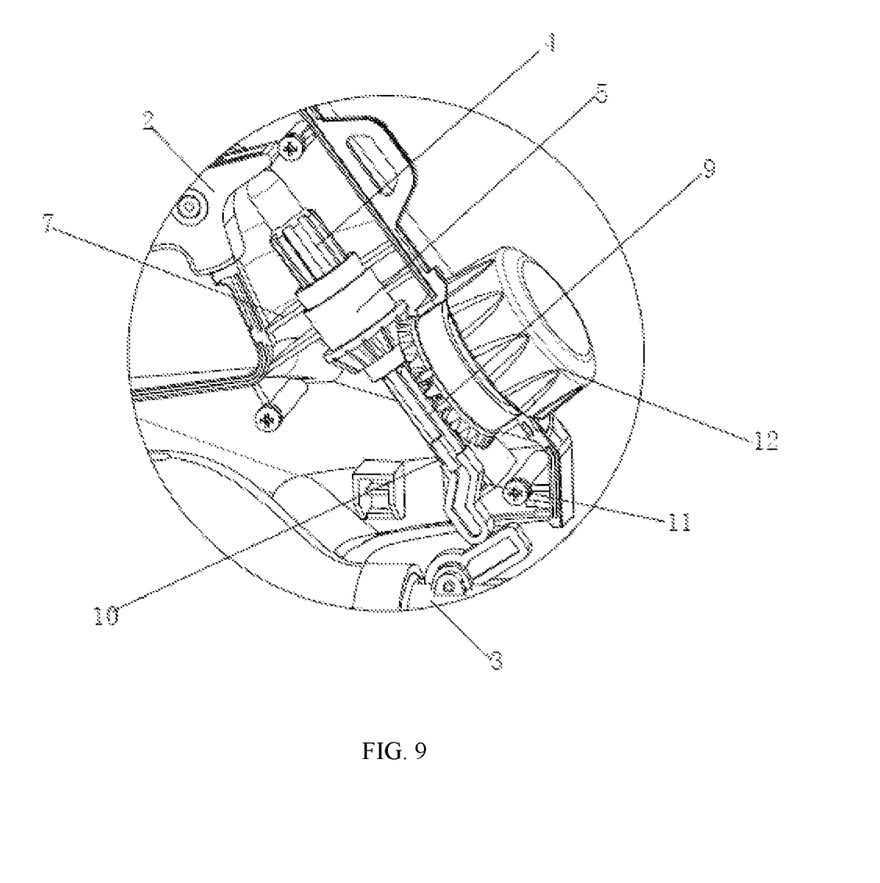
FIG. 9 is an enlarged view of part A in FIG. 2.
Figure 10:
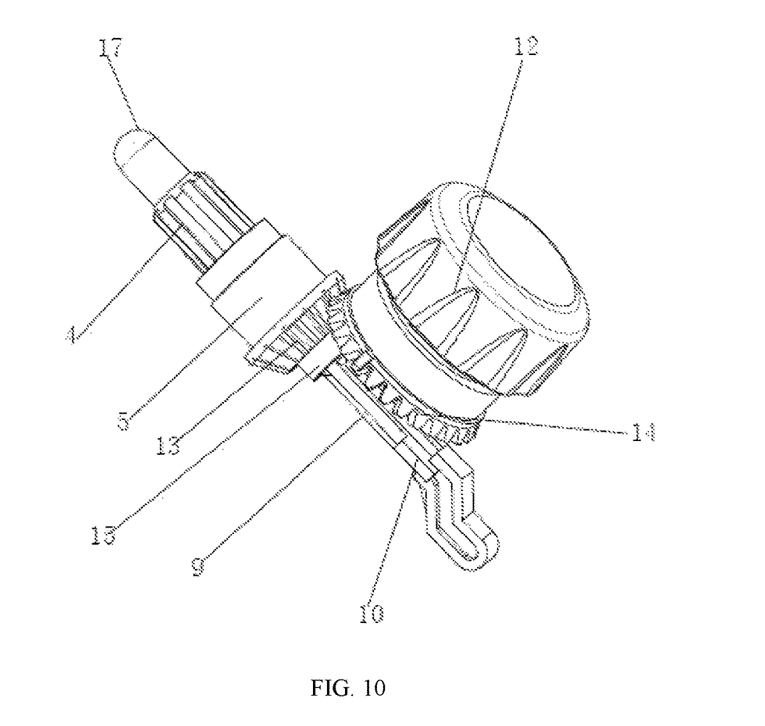
FIG. 10 is an overall structural view of the regulating mechanism.
Figure 11:
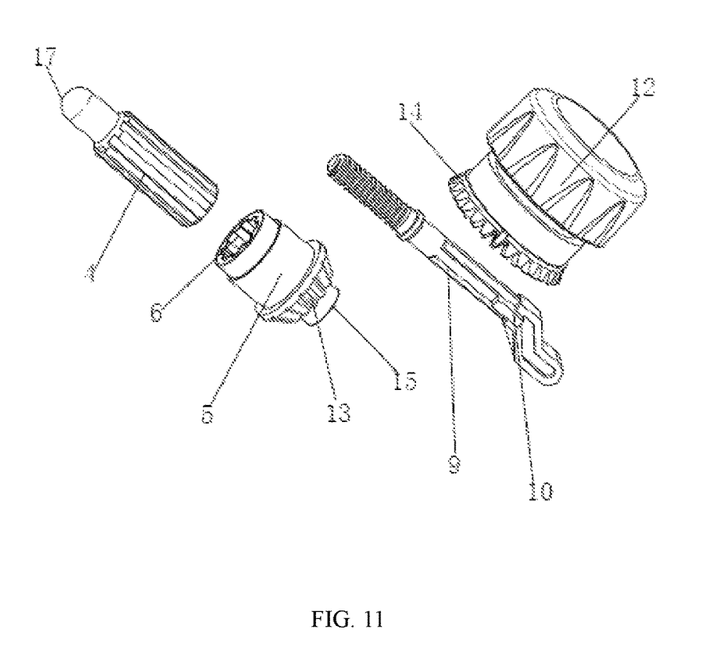
FIG. 11 is an exploded structural view of the regulating mechanism.
Figure 12:
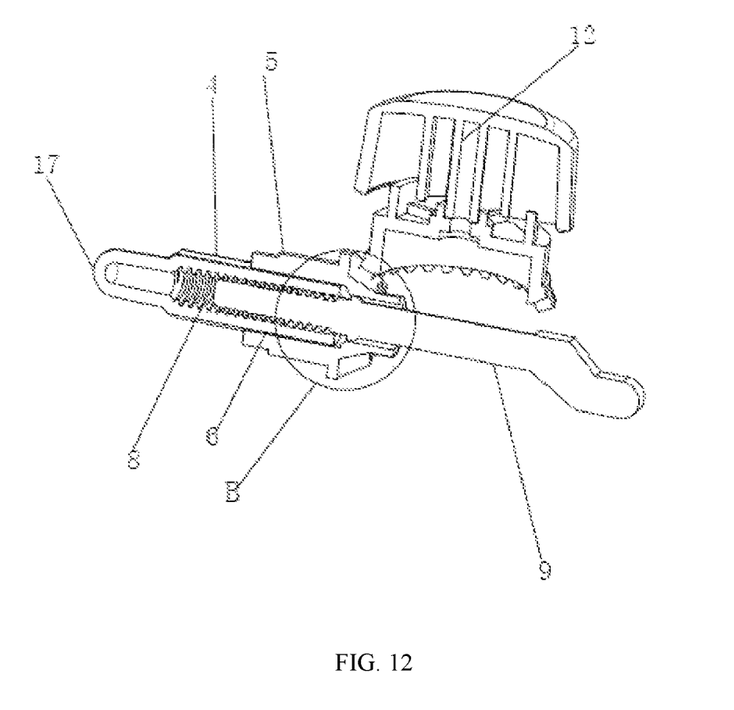
FIG. 12 is a sectional view of the regulating mechanism.
Figure 13:
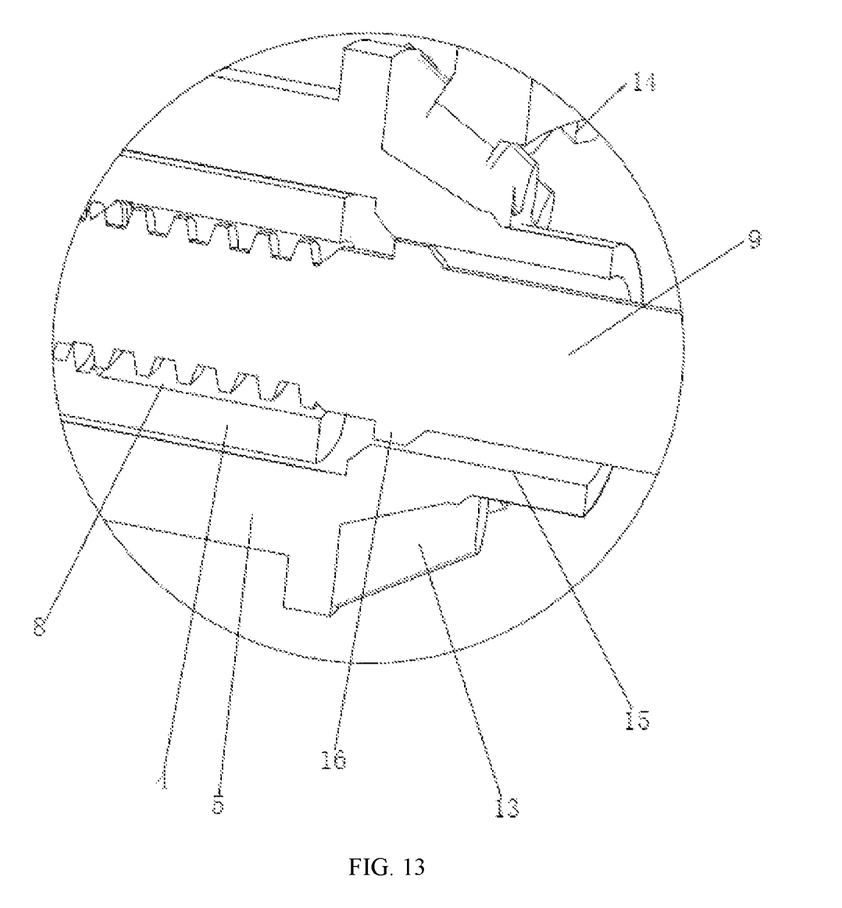
FIG. 13 is an enlarged view of part B in FIG. 12.

As shown in FIGS. 6-10, the regulating mechanism 19 comprises a spline shaft 4 rotatably arranged in the housing 1 and a rotating ferrule 5 disposed around the spline shaft 4 and capable of moving in a length direction of the spline shaft 4, wherein a guide groove 6 matched with the spline shaft 4 is formed in an inner wall of the rotating ferrule 5, a limiting plate 7 used for restraining the rotating ferrule 5 from moving in the length direction of the spline shaft 4 is fixedly arranged on the housing 1, a rotating groove 8 extending into the spline shaft 4 is formed in a lower surface of the spline shaft 4, an ejector rod 9 is movably arranged in the rotating groove 8 by threaded connection, a guide plate 10 is fixedly arranged on each of two sides of the ejector rod 9, clamping grooves 11 are fixedly arranged in the housing 1, the guide plates 10 are able to move in the clamping grooves 11 in a length direction of the ejector rod 9 as the ejector rod 9 moves, and an adjusting knob 12 for controlling the rotating ferrule 5 to rotate is arranged on the housing 1.

The adjusting knob 12 is rotatably arranged on the housing 1, a first gear 13 is fixedly arranged at an end, facing the ejector rod 9, of the rotating ferrule 5, a second gear 14 always meshed with the first gear 13 is fixedly arranged at an end, facing the rotating ferrule 5, of the adjusting knob 12, and the adjusting knob 12 is able to drive the rotating ferrule 5 to rotate around the central axis of the rotating ferule 5 by means of the first gear 13 and the second gear 14 matched with the first gear 13. When rotated, the adjusting knob drives the rotating ferrule 5 disposed around the spline shaft 4 to rotate around the rotation center of the spline shaft 4 by means of the first gear 13 and the second gear 14 always meshed with the first gear 13, the guide plates 10 on the two sides of the ejector rod 9 are clamped in the clamping grooves 11 to restrain the rotation of the ejector rod 9, the ejector rod 9 is driven by the rotating spline shaft 4 threadedly connected to the ejector rod 9 to move in a length direction of the clamping grooves 11 to adjust the overall length of the spline shaft 4 and the ejector rod 9, the press button 2 can be pressed to change the length of the regulating mechanism to adjust the gap between the plug in the water outlet tube 3 and an water outlet so as to regulate the outlet flow rate, the structure is simple, and the outlet flow rate can be regulated easily.

The first gear 13 is a bevel gear, the second gear 14 inclines gradually towards the periphery of the adjusting knob 12 in a direction from the adjusting knob 12 to the rotating ferrule 5, and a length direction of teeth on the second gear 14 is perpendicular to a length direction of teeth on the first gear 13. Because the length direction of the teeth on the second gear 14 is perpendicular to the length direction of the teeth on the first gear 13, the force for rotating the adjusting knob 12 can be completely transferred onto the first gear 13, thus saving labor.

A spacing ring 15 is fixedly arranged at the end, facing the ejector rod 9, of the rotating ferrule 5, the spacing ring 15 is located in the first gear 13 and disposed around the ejector rod 9, an inner diameter of the spacing ring 15 is less than an outer diameter of the spline shaft 4, a positioning ring 16 is fixedly arranged on the ejector rod 9, and the diameter of the positioning ring 16 is greater than the diameter of the ejector rod 9 and less than the inner diameter of the spacing ring 15. When assembled, a lower end of the spline shaft 4 leans against an end face, facing the spline shaft 4, of the spacing ring 15, and the ejector rod 9 is assembled in the spline shaft 4 by threaded connection until the positioning ring 16 leans against the end face, facing the ejector rod 9, of the spline shaft 4. By limiting the assembly position of the ejector rod 9 by means of the positioning ring 16, accurate positioning can be realized during installation.

A retaining block 17 is fixedly arranged at an end, away from the ejector rod 9, of the spline shaft 4. The retaining block 17 is a spherical retaining block 17. When the press button 2 on the atomizer is pressed, the spline shaft 4 is driven to move, the press button 2 always leans against the retaining block 17 and keeps rotating when pressed, and the end face of the press button 2 always leans against the retaining block 17, such that the press button will not get stuck in the pressing process and can be pressed more smoothly.

The specific embodiments described in the specification are merely used for describing the spirit of the invention by way of examples. Those skilled in the art can make various amendments, supplements or similar substitutions to the specific embodiments described above without deviating from the spirit of the invention or exceeding the scope defined by the appended claims.

What is claimed is:

1. An atomizer, comprising a housing, a water outlet tube, a fan for blowing air to the water outlet tube, a motor for driving the fan to rotate, a water tank, and a power supply for supplying power to the motor, wherein a guide tube for discharging water from the water outlet tube in a direction away from the fan is fixedly arranged in the water outlet tube, a pressurizing tube connected to the water tank is arranged in the water outlet tube, a water inlet tube connected to the water tank is arranged in the guide tube, and an end, away from the guide tube, of the water inlet tube is located at a bottom of an interior of the water tank;

a control switch for controlling the fan to be turned on or off and the water outlet tube to be opened or closed is arranged in the housing, the control switch comprises a push button for controlling the fan to be turned on or off and a press button for driving a regulating mechanism to move, a sliding groove used for clamping the push button and allowing the push button to reciprocate in a length direction of the push button is formed in the housing.

2. The atomizer according to claim 1, wherein a rotating rod is fixedly arranged in the housing, the press button is rotatably arranged on the rotating rod, the press button has a first end located below the push button and a second end leaning against the regulating mechanism, a fixed rod is fixedly arranged at a lower end of the push button, a clamping groove for clamping the fixed rod is formed in an upper surface of a side, away from the regulating mechanism, of the press button, and the push button is configured to move towards the press button in a length direction of the sliding groove and press the press button to enable the press button to rotate around the rotating rod to allow the clamping groove in the press button to rotate upwards around the rotating rod to clamp the fixed rod.

3. The atomizer according to claim 2, wherein a fixed pillar is fixedly arranged on an end face, facing the press button, of the fixed rod, the fixed pillar is sleeved with a spring for driving the push button to move away from the press button, a clamping seat used for clamping the spring and having an opening facing the fixed rod is fixedly arranged in the housing, and an end, away from the fixed pillar, of the spring is clamped in the clamping seat.

4. The atomizer according to claim 2, wherein the rotating rod is sleeved with a torsion spring for driving an end, away from the regulating mechanism, of the press button to rotate downwards around the rotating rod, a clamping pillar is fixedly arranged on the housing and located above the press button, a first end of the torsion spring is clamped on the clamping pillar, and a second end of the torsion spring is fixedly arranged on the press button.

5. The atomizer according to claim 4, wherein a push block is fixedly arranged at an upper end of the push button, an upper end of the push block is located on an outer side of the housing, a moving groove for clamping the push block is formed in the housing, the moving groove is longer than the push block, on and off marks are arranged on the push button, and the on and off marks are respectively located on two sides of the push block on the push button, located on a same line as the push block and parallel to the length direction of the push button.

6. The atomizer according to claim 1, wherein the regulating mechanism for regulating an outlet flow rate of the water outlet tube is arranged between the control switch and the water outlet tube, the regulating mechanism comprises a spline shaft rotatably arranged in the housing and a rotating ferrule disposed around the spline shaft and configured for moving in a length direction of the spline shaft, a guide groove matched with the spline shaft is formed in an inner wall of the rotating ferrule, a limiting plate used for restraining the rotating ferrule from moving in the length direction of the spline shaft is fixedly arranged on the housing, a rotating groove extending into the spline shaft is formed in a lower surface of the spline shaft, an ejector rod is movably arranged in the rotating groove by a threaded connection, guide tubes are fixedly arranged on two sides of the ejector rod, clamping grooves are fixedly arranged in the housing, the guide plates are configured to move in the clamping grooves in a length direction of the ejector rod as the ejector rod moves, and an adjusting knob for controlling the rotating ferrule to rotate is arranged on the housing.

7. The atomizer according to claim 6, wherein the adjusting knob is rotatably arranged on the housing, a first gear is fixedly arranged at an end, facing the ejector rod, of the rotating ferrule, a second gear always meshed with the first gear is fixedly arranged at an end, facing the rotating ferrule, of the adjusting knob, and the adjusting knob is configured to drive the rotating ferrule to rotate around a central axis of the rotating ferule by the first gear and the second gear matched with the first gear.

8. The atomizer according to claim 7, wherein the first gear is a bevel gear, the second gear inclines gradually towards a periphery of the adjusting knob in a direction from the adjusting knob to the rotating ferrule, and a length direction of teeth on the second gear is perpendicular to a length direction of teeth on the first gear.

9. The atomizer according to claim 8, wherein a spacing ring is fixedly arranged at the end, facing the ejector rod, of the rotating ferrule, the spacing ring is located in the first gear and disposed around the ejector rod, an inner diameter of the spacing ring is less than an outer diameter of the spline shaft, a positioning ring is fixedly arranged on the ejector rod, and a diameter of the positioning ring is greater than a diameter of the ejector rod and less than the inner diameter of the spacing ring.

10. The atomizer according to claim 6, wherein a retaining block is fixedly arranged at an end, away from the ejector rod, of the spline shaft.

* * * * *